(12) United States Patent
Planche (10) Patent No.: US 10,678,534 B2
(45) Date of Patent: Jun. 9, 2020

(54) METHOD FOR UPDATING A PLURALITY OF VEHICLES AND ASSEMBLY FORMED BY A PLURALITY OF RAILWAY VEHICLES AND AN ASSOCIATED MANAGEMENT SYSTEM

(71) Applicant: Alstom Transport Technologies, Saint-Ouen (FR)

(72) Inventor: Lilian Planche, Lyons (FR)

(73) Assignee: Alstom Transport Technologies, Saint-Ouen (FR)

( * ) Notice: Subject to any disclaimer, the term of this patent is extended or adjusted under 35 U.S.C. 154(b) by 0 days.

(21) Appl. No.: 15/639,566

(22) Filed: Jun. 30, 2017

(65) Prior Publication Data
US 2018/0011703 A1 Jan. 11, 2018

(30) Foreign Application Priority Data

Jul. 5, 2016 (FR) ...................................... 16 56424

(51) Int. Cl.
| | | |
|---|---|---|
| *G06F 9/44* | (2018.01) | |
| *G06F 8/654* | (2018.01) | |
| *G06F 8/65* | (2018.01) | |
| *H04L 29/08* | (2006.01) | |

(Continued)

(52) U.S. Cl.
CPC .......... *G06F 8/654* (2018.02); *B61L 15/0027* (2013.01); *B61L 15/0072* (2013.01); *G06F 8/65* (2013.01); *H04L 41/082* (2013.01); *H04L 67/2842* (2013.01); *H04L 67/34* (2013.01); *H04L 67/12* (2013.01)

(58) Field of Classification Search
CPC .......... G06F 8/654; G06F 8/658; G06F 8/665; G06F 8/70; G06F 11/2097; H04L 41/082; H04L 67/12; B61L 15/0027; B61L 15/0072
See application file for complete search history.

(56) References Cited

U.S. PATENT DOCUMENTS

| | | | |
|---|---|---|---|
| 9,128,798 B2 * | 9/2015 | Hoffman | .................... G06F 8/65 |
| 9,332,061 B2 * | 5/2016 | Taoka | ...................... H04L 67/34 |
| 9,703,798 B2 * | 7/2017 | Srinivasan | ........ G06F 17/30165 |

(Continued)

OTHER PUBLICATIONS

Radovan Miucic; "Intelligent Communication for Future Automobile Networks"; Jan. 1, 2009, XP002767716, URL: http://ece.eng.wayne.edu/smahmud/MyStudents/Dissertation_Radovan.pdf.

(Continued)

*Primary Examiner* — Jae U Jeon
(74) *Attorney, Agent, or Firm* — Troutman Sanders LLP (57) ABSTRACT

A method for applying a plurality of vehicles each including an onboard server and at least two apparatuses, an onboard server and each of the apparatuses storing initial data, each onboard server being connected to the apparatuses mounted in the same vehicle with a local network. The method includes the steps of transferring modified data, through an extended radiofrequency communication network, from a server on the ground towards the onboard servers, when the modified data have been stored in memory in each onboard server, emitting via the extended network, an updating command, and transmitting modified data to at least one apparatus through the corresponding local network, the modified data replacing, in the apparatus, the initial data.

7 Claims, 2 Drawing Sheets

(51) Int. Cl.
   *B61L 15/00*      (2006.01)
   *H04L 12/24*      (2006.01)

(56) References Cited

U.S. PATENT DOCUMENTS

| | | | |
|---|---|---|---|
| 9,902,392 B2* | 2/2018 | Ogawa | B60W 20/12 |
| 9,960,820 B2* | 5/2018 | McCormack | H04W 8/085 |
| 2009/0300595 A1* | 12/2009 | Moran | G06F 8/65 |
| | | | 717/170 |
| 2013/0007437 A1* | 1/2013 | Shroni | G06F 8/654 |
| | | | 713/2 |
| 2016/0291959 A1* | 10/2016 | Searle | H04L 41/082 |

OTHER PUBLICATIONS

International Search Report dated Mar. 1, 2017, issued in corresponding French Application No. 1656424.

* cited by examiner

METHOD FOR UPDATING A PLURALITY OF VEHICLES AND ASSEMBLY FORMED BY A PLURALITY OF RAILWAY VEHICLES AND AN ASSOCIATED MANAGEMENT SYSTEM

CROSS REFERENCE TO RELATED APPLICATIONS

The present application claims priority to French Application No. FR 16 56424 filed Jul. 5, 2016. This application is incorporated herein by reference in its entirety.

FIELD OF THE INVENTION

The present invention relates to a method for updating a plurality of vehicles. The present invention also relates to an assembly formed from a plurality of vehicles and from a management system for the plurality of vehicles. The vehicles are for example, railway vehicles.

BACKGROUND

Many vehicles are equipped with electronic equipments giving the possibility of many functions. For example, safety equipments such as signaling, traction control, maintenance management systems, or further network equipments, are frequently mounted on many types of vehicles. Other electronic equipment gives the possibility of functions for communication, optimization of the performance and of the energy consumption of the vehicles, or further for monitoring proper operation of the latter.

Electronic equipment of the aforementioned types generally comprises a memory on which are stored data, and in particular software instructions which are applied by a controller for executing said functions. Such software instructions provide the advantage of being able to be modified in order to improve the operation of the equipment or for adapting it to a modification of the vehicle, for example if other apparatuses with which the equipment is in interaction are mounted on the vehicle. Thus, in most cases, it is not necessary to modify the actual piece of equipment, but only adapt the software instructions. Such a modification of the software instructions is called "updating".

However, the updating of the apparatus generally requires the intervention of a specialized technician. Thus, either the technician has to move to the location where the vehicle is found, or the vehicle has to be immobilized at the depot so that the technician carries out the updating. The updating of a large number of vehicles, for example a fleet of vehicles managed by a public transport company or a fleet of trains, is therefore long. Further, it involves a significant loss in availability of the relevant vehicles, which are generally immobilized for updating during the day, during the usual working hours of the technician.

Further, a sometimes quite long period may exist during which several versions of the same software instructions coexist, the time for the technician(s) for completing the updating on the whole fleet, which adds complexities to the management of the fleet by the operator.

SUMMARY

Thus, there exists a need for a method for updating electronic equipment of a fleet of vehicles which allows better availability of the vehicles.

For this purpose, the object of the invention is a method for updating a plurality of vehicles, each vehicle including an onboard server, a first electronic apparatus and at least one second electronic apparatus, the onboard server comprising a first memory and a radiofrequency communication module and each of the first apparatus and of the second apparatus comprising a controller and a second memory storing a set of initial data, each onboard server being connected to each of the first apparatus and of the second apparatus mounted in the same vehicle with a local internal communication network of the vehicle. The method includes the following steps:

transferring updated data, through an extended radiofrequency communication network, from at least one server on the ground to the onboard servers of the vehicles of said plurality, the updated data including modified data intended to be stored in memory by at least one of the first apparatus and of the second apparatus of each relevant vehicle, storing in memory updated data in the first memory of each vehicle, when the updated data have been stored in memory in the first memory of each vehicle, emitting through the extended network, by a server on the ground, a command for updating intended for the onboard server of each vehicle, and transmitting, by each onboard server having received the updating command, data modified at at least one of the first apparatus and of the second apparatus through the corresponding local network, modified data replacing, in the second memory of said apparatus, the initial data.

According to other advantageous aspects of the invention, the method comprises one or several of the following features, taken individually or according to all the technically possible combinations:

the transmission step comprises the following sub-steps:
sending an updating request, by each onboard server having received the updating command, to at least one from among the first apparatus and the second apparatus of the same vehicle,
sending back, by said apparatus, of an updating authorization to the onboard server, and
replacing said apparatus, original data with the modified data, the sub-step for replacement being applied after reception, by the onboard server, of the corresponding authorization for updating;

an active state and an inactive state are defined for each vehicle of the plurality, the inactive state being representative of the fact that the vehicle is not moving and the active state being representative of the fact that the vehicle is moving, at least one of the first apparatus and of the second apparatus being configured for, during the sending back sub-step, sending back the authorization if the vehicle is in the inactive state and if said vehicle is in the active state, waiting until said vehicle switches into the inactive state for sending back the authorization;

in the emission step, the updating command is simultaneously emitted by the server on the ground intended for each onboard server of the plurality of vehicles;

the transmission step is applied successively for the first apparatus and the second apparatus of a same vehicle according to a predetermined order;

in the emission step, the updating command is successively emitted by the server on the ground intended for each onboard server of the plurality of vehicles;

the transmission step is applied simultaneously for the first apparatus and the second apparatus of a same vehicle;

the first apparatus is configured for transmitting information between the second apparatus and the onboard server, the updating data comprising first modified data intended to be stored in the second memory of the first apparatus and second modified data intended to be stored in the second memory of the second apparatus, the second modified data being transmitted to the second apparatus during the transmission step, no first modified datum being transmitted to the first apparatus before the second modified data have been entirely stored in memory by the second apparatus;

the updating data are distributed in a set of data packets and, during the transfer step, a set of transfer messages is emitted by the server on the ground intended for each onboard server, each transfer message including a data packet and a check sum, the onboard server being configured for calculating each check sum from the corresponding data packet, and for comparing the calculated check sum with the check sum contained in the transfer message, each check sum calculated by each onboard server being further transmitted to the server on the ground, the server on the ground comparing each check sum received with the check sum transferred with the corresponding transfer message;

the beginning of the emission step is shifted from the end of the transfer step by a time period greater than or equal to 5 seconds.

The object of the invention is also a set formed with a plurality of railway vehicles and with a system for managing the plurality of railway vehicles, each railway vehicle including an onboard server, a first electronic apparatus and at least one second electronic apparatus, the onboard server comprising a first memory and a radiofrequency communication module and each of the first apparatus and of the second apparatus comprising a controller and a second memory storing a set of initial data, each onboard server being connected to each of the first apparatus and of the second apparatus through a local internal communication network of the vehicle, and the management system including a server on the ground. The server on the ground is configured for:

transferring, by radiofrequency communication, data for updating the onboard server of each vehicle through the extended network, the updating data including modified data intended to be stored in memory in the second memory of at least one of the first apparatus and of the second apparatus, and for emitting, through the extended network, an updating command intended for the onboard server of each vehicle from the plurality of vehicles when the updating data have been stored in the first memory of each vehicle having received the updated data, and each onboard server is configured for:

storing in memory the updated data in the first memory, and subsequently to the reception of the updating command, transmitting the modified data to at least one from among the first apparatus and the second apparatus through the corresponding local network, the modified data replacing in the second memory of said apparatus, the initial data.

BRIEF DESCRIPTION OF THE DRAWINGS

The characteristics and advantages of the invention will become apparent upon reading the description which follows, only given as a non-limiting example, and made with reference to the appended drawings, wherein.

DETAILED DESCRIPTION

An assembly 1 according to the invention is described with reference to FIG. 1. The assembly 1 comprises a plurality of vehicles 10 and a management system 15 for the plurality of vehicles 10.

Each vehicle 10 is a railway vehicle. For example, each vehicle 10 is a train. Alternatively, each vehicle 10 is a carriage of a train including several carriages. According to another alternative, each vehicle 10 is a tramway.

According to another alternative, each vehicle 10 is a road vehicle, for example a bus.

An active state is defined for each vehicle 10. The active state is representative of the fact that the vehicle 10 is moving. For example, the vehicle 10 is in the active state when an engine of the vehicle 10 is in operation. Alternatively, the vehicle 10 is in the active state when the engine of the vehicle 10 is powered.

An inactive state is defined for each vehicle 10. The inactive state is representative of the fact that the vehicle 10 is not moving. For example, the vehicle 10 is in the inactive state when an engine of the vehicle 10 is switched off. Alternatively, the vehicle 10 is in the inactive state when the engine of the vehicle 10 is not powered.

Alternatively, time slots are defined during which the vehicle 10 is able to be in commercial operation and time slots during which the vehicle 10 is in the garage, and the vehicle 10 is in the inactive state exclusively during time slots during which the vehicle 10 is in the garage. These time slots are for example entered manually by an operator or are provided by a system for managing the fleet of vehicles 10.

Each vehicle 10 includes an onboard server 20 and a plurality of electronic apparatuses 25. For example, each vehicle 10 includes a first apparatus 25A, a second apparatus 25B and a third apparatus 25C. Alternatively, each vehicle 10 includes a first apparatus 25A and at least one second apparatus 25B.

Each onboard server 20 is configured for exchanging information with at least one apparatus 25A, 25B, 25C mounted in the same vehicle 10. For example, each onboard server 20 is configured for exchanging information with each apparatus 25A, 25B, 25C mounted in the same vehicle 10. In particular, each onboard server 20 is connected to the apparatuses 25A, 25B, 25C mounted in the same vehicle 10 through a local network R1.

Each onboard server 20 is further configured for exchanging information with the management system 15. For example, each onboard server 20 belongs to an extended communication network R2.

Each onboard server 20 includes a radiofrequency communication module 30, a first memory 35 and a computer 40.

The radiofrequency communication module 30 is configured for emitting or receiving data transmitted via a signal including at least one radiofrequency electromagnetic wave EMW.

Preferably, the radiofrequency communication module 30 is able to emit and receive transmitted data via a signal including at least one radiofrequency electromagnetic wave EMW.

Radiofrequency electromagnetic waves EMW are electromagnetic waves having a frequency comprised between 3 kilohertz (kHz) and 6 gigahertz (gHz).

The radiofrequency communication module 30 is configured for receiving through the extended network R2, updating data Dm from the management system 15. For example, the radiofrequency communication module 30 is configured for receiving, through the extended network R2, at least one transfer message MT of the management system 15.

The updating data Dm include modified data Mo1, Mo2, Mo3 intended to be stored in memory in the memory of at least one apparatus 25A, 25B, 25C.

The updating data Dm are distributed in a set of data packets P.

By <<data packet>> is meant a set of data transmitted in a single transfer message.

Each transfer message MT contains a data packet P and a check sum CS. As an optional addition, each transfer message MT contains an identifier of an onboard server 20 or of the vehicle 10 which includes said onboard server 20, for which the transfer message MT is intended.

A check sum CS (also called <<checksum>>, sometimes also called an <<imprint>>), is a number which is added to a message to be transmitted in order to allow the receiver to check whether the received message is actually the one which was sent. For example, the check sum CS is a number calculated from data to be transmitted, in such a way that a modification of the transmitted data induces a modification of the calculated check sum CS.

The first memory 35 is able to store a sending piece of software, a calculation piece of software and a replacement piece of software.

Each local network R1 is a computer network such that the elements which belong to the local network send to each other data frames at the connection layer without using access to internet.

Each local network R1 is for example a LAN network (local area network), which means a <<local network>>.

Each local network R1 is for example a wired network such as an Ethernet network using a TCP/IP protocol. The TCP/IP series is the set of protocols used for transferring data on Internet. It is often called TCP/IP, according to the name of its first two protocols: TCP (Transmission Control Protocol) and IP (Internet Protocol). These protocols are described in the reference document RFC 1122.

Alternatively, each local network R1 is a wireless network, for example a Wi-Fi network. Wi-Fi is a set of wireless communication protocols governed by the standards of the IEEE 802.11 group (ISO/CEI 8802-11). Each local network R1 is an internal network to the relevant vehicle 10. In particular, only devices mounted in the relevant vehicle 10 are able to exchange data through the local network R1.

The extended network R2 differs from the local network R1, in the sense that the global network R2 covers a larger geographic area than the local network R1.

The extended network R2 is for example, a WAN network (wide area network), which means "extended network". In the example of FIG. 1, the extended network R2 is represented as a wired network but it is clear that alternatively, the extended network R2 is a wireless network.

Preferably, the extended network R2 is a mobile phone network. This means that the extended network R2 is configured for allowing exchange of telephone data by radiofrequency electromagnetic waves.

For example, the extended network R2 is a mobile telephone network according to the GSM standard established by the "European Telecommunications Standards Institute", with the UMTS standard or further the LTE standard.

The Universal Mobile Telecommunications System (UMTS) is one of the mobile telephone technologies of a third generation (3G). UMTS is defined by the "3rd Generation Partnership Project" (3GPP).

The LTE (Long Term Evolution) is an evolution in the mobile telephone standards GSM and UMTS, itself also defined by 3GPP.

Alternatively, the extended network R2 is a Wi-Fi network.

The sending piece of software is configured for sending, through the local network R1, a request for updating to at least one from among the first apparatus 25A, the second apparatus 25B and the third apparatus 25C of the vehicle 10.

The calculation piece of software is configured for calculating, from the data packet P contained in each transfer message MT, the check sum CS. The calculation piece of software is further configured for comparing each calculated check sum CS with the check sum CS contained in the corresponding transfer message MT.

The replacement piece of software is configured for replacing data stored in memory in the second memory of at least one from among the first apparatus 25A, the second apparatus 25B and the third apparatus 25C with modified data Mo1, Mo2, Mo3.

When they are executed on the computer 40, the sending piece of software, the calculation piece of software and the replacement piece of software respectively form a module 42 for sending an updating request, a module 43 for calculating a check sum CS and a replacement module 44.

Each of the first apparatus 25A, of the second apparatus 25B and of the third apparatus 25C is an electronic apparatus. In particular, each of the first apparatus 25A, of the second apparatus 25B and of the third apparatus 25C is configured for handling and/or transforming data represented as electronic or physical quantities in the registers of a controller and/or in memories into other similar data corresponding to physical data in memories, registers or other types of display, transmission or memory storage devices.

Each of the first apparatus 25A, of the second apparatus 25B and of the third apparatus 25C includes a controller 45 and a second memory 50.

For example, the first apparatus 25A is a network switch.

For example, the second apparatus 25B is a traction computer able to control an engine of the vehicle 10.

For example, the third apparatus 25C is a signaling computer able to exchange signaling signals with apparatuses external to the vehicle 10.

Alternatively, the third apparatus 25C is a braking computer able to control the braking of the vehicle 10.

Each of the first apparatus 25A, of the second apparatus 25B and of the third apparatus 25C belongs to the local network R1.

Figure 1:
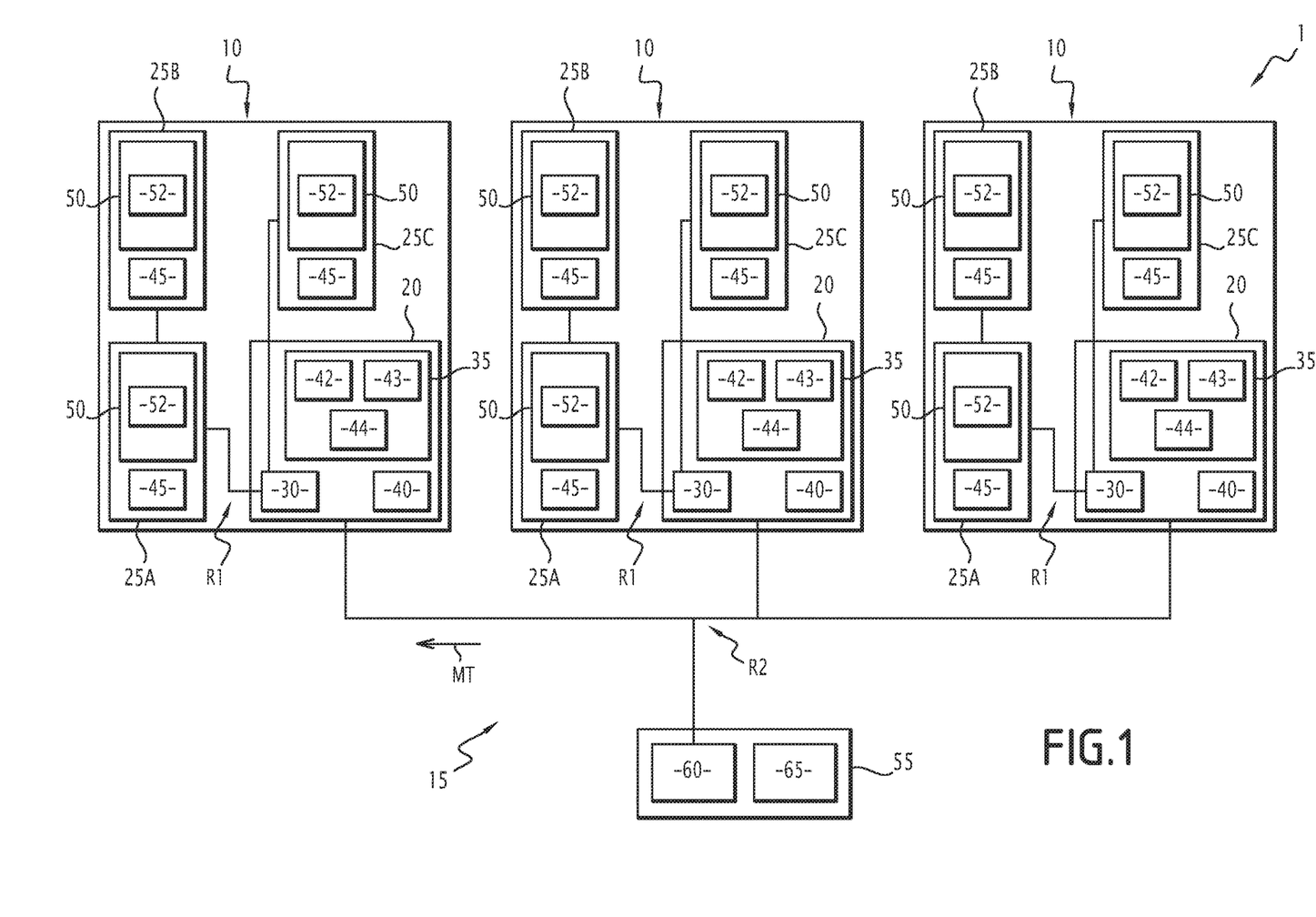
FIG. 1 is a schematic illustration of a set formed with a plurality of railway vehicles and with a management system of the plurality of vehicles according to the invention.

According to the example of FIG. 1, the first apparatus 25A and the third apparatus 25C are configured for directly exchanging information with the corresponding onboard server 20 through the local network R1. By "directly exchanging" is meant that the information transmitted is transmitted between the relevant apparatus and the onboard server 20 without passing through an intermediate electronic apparatus. For example, the first apparatus 25A and the third apparatus 25C are each connected to the server 20 by a single connection cable.

The first apparatus 25A plays the role of a communication relay between the second apparatus 25B and the onboard server 20. This means that the first apparatus 25A is configured for transmitting information between the second apparatus 25B and the corresponding onboard server 20. In particular, the first apparatus 25A is configured for receiving information from the second apparatus 25B and for transmitting said information to the corresponding onboard server 20. The first apparatus 25A is further configured for receiving information from the onboard server 20 and for transmitting said information to the second apparatus 25B.

For example, the local network R1 is a ring network. The first apparatus 25A, the second apparatus 25B, the third apparatus 25C and the onboard server 20 are then each connected to two other elements of the first network R1, the onboard server 20 being in particular connected to the first apparatus 25A and to the third apparatus 25C.

Alternatively, the first network R1 is a star-shaped network.

The controller 45 of each of the first apparatus 25A, of the second apparatus 25B and of the third apparatus 25C is configured for applying a predetermined function when software instructions are executed on the controller 45. For example, the controller 45 is configured for generating an analogue or digital command signal for an actuator of the vehicle 10.

The second memory 50 of each apparatus 25A, 25B, 25C is configured for storing initial data.

The second memory 50 is able to store in memory a piece of authorization software.

Each piece of authorization software is configured for accepting or refusing a request for an update and for communicating, depending on the case, an updating authorization or a refusal to the onboard server 20.

The authorization is for example a message comprising an indicator of the relevant apparatus 25A, 25B, 25C.

As an optional addition, the piece of authorization software of at least one from among the first apparatus 25A, the second apparatus 25B and the third apparatus 25C is configured for detecting the state of the vehicle 10 and for sending back the authorization depending on the state of the vehicle 10. For example, at least one of the pieces of authorization software comprises an indicator of the state of the vehicle 10. The indicator is for example a set of data equal to zero if the vehicle 10 is in the active state and equal to one if the vehicle 10 is in the inactive state.

For example, the piece of authorization software of the third apparatus 25C is configured for sending back the corresponding authorization if the vehicle 10 is in the inactive state. The piece of authorization software of the third apparatus 25C is configured for, if the vehicle 10 is in the active state, waiting that the vehicle 10 switches into the inactive state for sending back the authorization. In other words, the piece of authorization software of the third apparatus 25C is configured for, when the vehicle 10 is in the active state, refusing the updating.

This is for example the case if the third apparatus 25C is a traction computer, a braking computer or further a signaling computer.

When it is executed on the computer 40, the piece of authorization software forms an authorization module 52.

The management system 15 is configured for ordering the updating of at least one from among the first apparatus 25A, the second apparatus 25B and the third apparatus 25C of each vehicle 10.

The management system 15 includes at least one server on the ground 55. For example, the management system 15 includes two servers on the ground 55. Preferably, the management system 15 includes a single server on the ground 55.

The server on the ground 55 differs from each onboard server 20 in that the server on the ground 55 is not loaded onboard one of the vehicles 10. For example, the server on the ground 55 is fixed relatively to a building in which the server on the ground 55 is mounted.

Alternatively, the server on the ground 55 is movable. For example, the server on the ground 55 is movable relatively to a building in which the server on the ground 55 is mounted.

The server on the ground 55 is configured for storing in memory the updating data Dm and for transmitting the updating data Dm, through the extended network R2, to at least one of the onboard servers 20. Preferably, the server on the ground 55 is configured for transmitting the updating data Dm, through the extended network R2, to each onboard server 20 of the plurality of vehicles 10.

The updating data Dm include modified data Mo1, Mo2, Mo3 intended to be stored in memory in the second memory 50 of at least one from among the first apparatus 25A, the second apparatus 25B and the third apparatus 25C.

For example, the updating data Dm include first modified data Mo1, second modified data Mo2 and third modified data Mo3. The first modified data Mo1 are intended to be stored in the second memory 50 of the first apparatus 25A of each vehicle 10. The second modified data Mo2 are intended to be stored in the second memory 50 of the second apparatus 25B of each vehicle 10. The third modified data Mo3 are intended to be stored in the second memory 50 of the third apparatus 25C of each vehicle 10.

Alternatively, the updating data Dm include first modified data Mo1 and second modified data Mo2.

The server on the ground 55 includes a transfer module 60 and a third memory 65. Advantageously, the server on the ground 55 also comprises a radiofrequency communication module.

The transfer module 60 is configured for transmitting the updating data Dm, through the extended network R2, to at least one of the servers onboard 20. In particular, the transfer module 60 is configured for transmitting each data message MT to said onboard server 20.

The transfer module 60 is further configured for receiving from at least one of the onboard servers 20 each check sum CS calculated by this onboard server 20.

The transfer module 60 is configured for emitting, for example on request from an operator, through the extended network R2, an updating command intended for the onboard server 20 of at least one of the vehicles 10 when the updating data Dm have been stored in memory in each onboard server 20.

The third memory 65 is able to store in memory the modified data Mo1, Mo2, Mo3.

The third memory 65 is further able to store in memory a piece of control software, and a piece of comparison software.

The piece of control software is configured for controlling the updating, by at least one onboard server 20, of at least one corresponding apparatus 25A, 25B, 25C.

The piece of comparison software is configured for comparing a check sum CS calculated by the calculation module 43 with a check sum stored in the third memory 65.

When they are executed on a computer of the ground server 55, the piece of control software and the piece of comparison software respectively form a control module and a comparison module.

The operation of the assembly formed by the plurality of vehicles 10 and the management system 15 will now be described.

Figure 2:
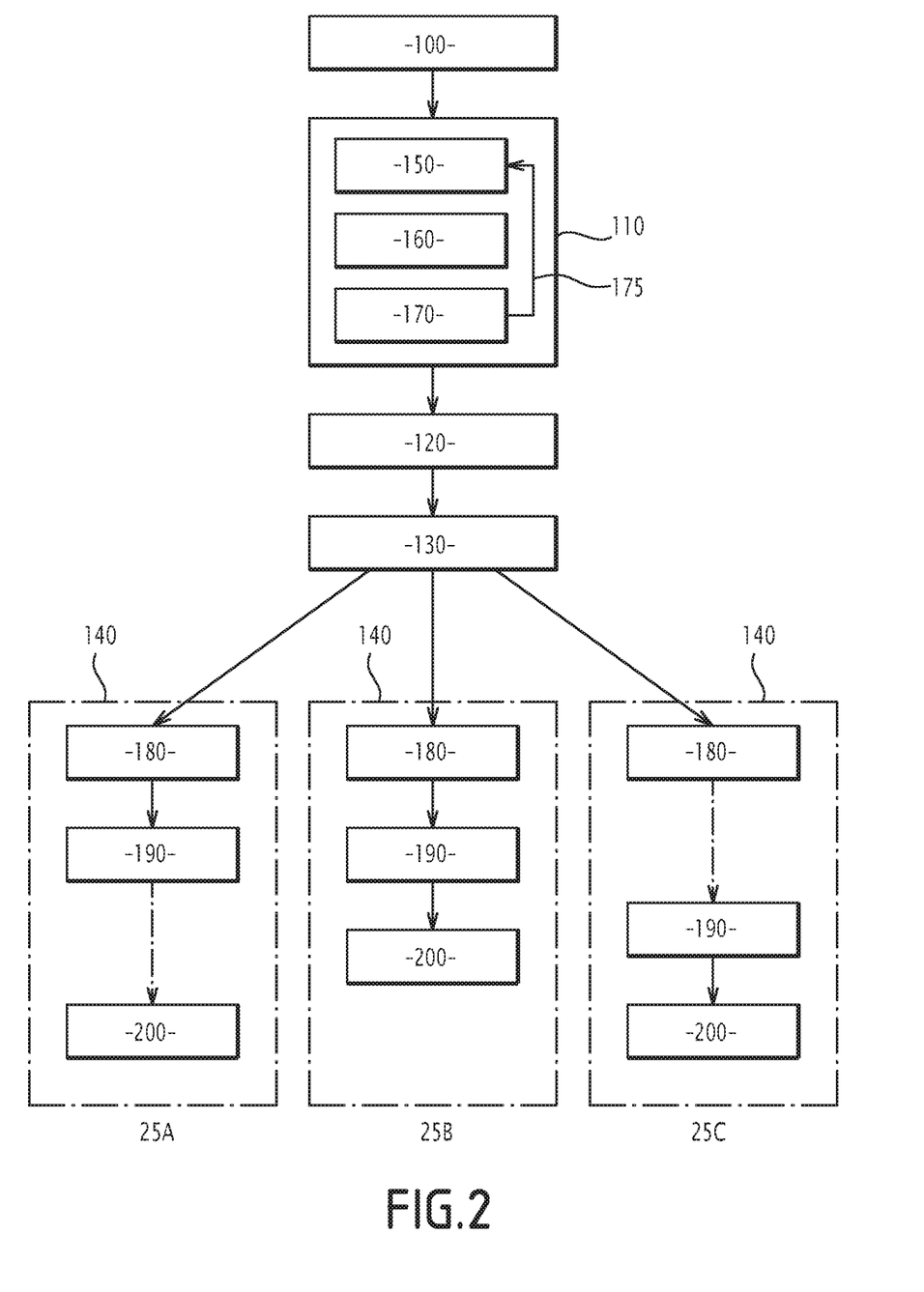
FIG. 2 is a flow chart of the steps of a method according to the invention for updating vehicles illustrated in FIG. 1.

A flow chart of a method for updating the plurality of vehicles 10 has been illustrated in FIG. 2. The updating method comprises an initialization step 100, a transfer step 110, a memory storage step 120, an emission step 130 and a transmission step 140.

During the initialization step 100, a user U of the management system 15 orders the transfer of updating data of at least one vehicle 10. For example, the user U enters a list of at least one vehicle 10 to be updated. Alternatively or additionally, the user U enters a list of at least two vehicles 10 to be updated. Alternatively, the user U requests the updating of each vehicle 10 of the plurality of vehicles 10.

During the initialization step 100, the second memory 45 of each of the first apparatus 25A, of the second apparatus 25B and of the third apparatus 25C contains a set of initial data. The initial data comprise the software instructions intended to be executed on the corresponding controller 45.

Next, during the transfer step 110, the updating data Dm are transferred to the onboard server 20 of each vehicle 10 of the list.

The updating data Dm are for example transferred according to an FTP or SFTP. File Transfer Protocol, or FTP, is a communication protocol intended for exchanging file information on a TCP/IP network. FTP gives the possibility from a computer, of copying files towards another computer of the network, or further to suppress or modify files on this computer.

Alternatively, the updating data Dm are transmitted according to an HTTP or HTTPS protocol. The HyperText Transfer Protocol, best known under the acronym of HTTP is a client-server communication protocol developed for the World Wide Web.

The transfer step 110 includes a sub-step 150 for transfer, a sub-step 160 for calculation and a sub-step 170 for sending back.

During the sub-step 150 for transfer, a transfer TM is transmitted to a server 20 of the list, through a radiofrequency communication, by the transfer module 60 to the server on the ground 55.

For example, the transfer module 60 selects a data packet P and generates the transfer message MT. The transfer module 60 calculates, additionally the check sum CS, stored in memory in the third memory 65 and integrates it into the transfer message MT.

During the sub-step 160 for calculation, the calculation module 43 of the onboard server 20 having received the transfer message MT calculates the check sum CS from the data packet P contained in the transfer message MT and compares the check sum CS calculated at the check sum CS contained in the transfer message MT.

If the calculated check sum CS is equal to the check sum CS contained in the transfer message MT, the sub-step 160 for calculation is followed by the sub-step 170 for sending back. Otherwise, the sub-step 150 for transfer is repeated with the same data packet P.

Next, during the sub-step 170 for sending back, the radiofrequency communication module 30 of the onboard server 20 having received the transfer message MT transmits to the ground server 55 the check sum SC calculated by the calculation module 43. The comparison module then compares the check sum CS calculated by the calculation module 43 with the check sum CS stored in memory in the third memory 65 of the server on the ground 55.

If the check sum CS calculated by the calculation module 43 is different from the check sum CS stored in memory in the third memory 65, the sub-step 150 for transfer is repeated with the same data packet P.

If the check sum CS calculated by the calculation module 43 is equal to the check sum CS stored in memory in the third memory 65, the sub-step 150 for transfer is repeated for a new data packet P. This is illustrated in FIG. 2 by an arrow 175.

Thus, during the transfer step 110, the updating data Dm are transferred to the onboard server 20 of each vehicle 10 of the list. For example, the updating data Dm transmitted to each vehicle 10 of the list are identical with each other.

In the memory storage step 120, each data packet P is stored in memory in the first memory 35 of the onboard server 20 having received the transfer message MT. At the end of the memory storage step 120, the updating data Dm are stored in memory in the first memory 35 of each vehicle 10 of the list.

At the end of the memory storage step 120, the first memory 35 therefore contains the first modified data Mo1, the second modified data Mo2 and the third modified data Mo3.

During the emission step 130, the control module generates an updating command. The transfer module 60 emits the updating command, through the extended network R2, intended for the onboard server 20 of each vehicle 10 of the list.

Preferably, the updating command is simultaneously emitted by the server on the ground 55, intended for the onboard server 20 of each vehicle 10 of the list. For example, the updating command is a message emitted intended for the corresponding vehicle 10 as a response to a periodically emitted message by the vehicle 10.

The emission step 130 is applied after the updating data Dm have been stored in memory in the first memory 35 of each vehicle 10 having received the updating data Dm. In other words, no updating command is emitted before each vehicle 10 of the list has received each of the transfer messages MT which are intended for it. For example, the emission step 130 is exclusively applied if, for each data packet P, the check sum CS calculated by the calculation module 43 is equal to the check sum CS stored in memory in the third memory 65.

According to the example of FIG. 2, the updating data Dm are therefore stored in memory in the first memory 35 of each vehicle 10 having received the updating data Dm before emitting the updating command. The emission step 130 is therefore separated from the transfer step 110 by a non-zero time period. For example, the beginning of the emission step 130 is shifted from the end of the transfer step 110 by a time period greater than or equal to 5 seconds.

During the transmission step 140, each onboard server 20 having received the updating command transmits the modified data Mo1, Mo2, Mo3 to at least one of the first apparatus 25A and of the second apparatus 25B. For example, each onboard server 20 having received the updating command transmits the modified data Mo1, Mo2, Mo3 to at least one of the first apparatus 25A, of the second apparatus 25B and of the third apparatus 25C.

According to the example of FIG. 2, each onboard server 20 having received the updating command transmits the modified data Mo1, Mo2, Mo3 to the first apparatus 25A, to the second apparatus 25B and to the third apparatus 25C. This is illustrated in FIG. 2 with three transmission steps 140 (a transmission step 140 for each of the first apparatus 25A, of the second apparatus 25B and of the third apparatus 25C.

The transmission step 140 includes a sub-step 180 for sending, a sub-step 190 for sending back and a sub-step 200 for replacement.

The transmission step 140 is successively applied for the first apparatus 25A and for the second apparatus 25B according to a predetermined sequence. For example, the transmission step 140 is applied for the first apparatus 25A after having applied the transmission step 140 for the second apparatus 25B and is completed. In particular, the first modified data Mo1 are not transmitted to the first apparatus 25A before the second modified data Mo2 have been entirely stored in memory in the second memory 50 of the second apparatus 25B.

Alternatively, the transmission step 140 is simultaneously applied for each of the first apparatus 25A, of the second apparatus 25B and of the third apparatus 25C.

For example, the sending step 180 is successively applied for the first apparatus 25A and for the second apparatus 25B according to a predetermined sequence. For example, the sending step 180 is applied for the second apparatus 25B, and the sending step 180 is applied for the first apparatus 25A after the replacement step 200 applied for the second apparatus 25B has been completed.

Alternatively, the sending step 180 is simultaneously applied for each apparatus 25A, 25B, 25C of a same vehicle 10, but the replacement step 200 is applied for each apparatus 25A, 25B, 25C according to a predetermined sequence. For example, the replacement step 200 is applied for the first apparatus 25A after the replacement step 200 applied for the second apparatus 25B has been completed.

During the sub-step for sending 180, the onboard server 20 of each vehicle 10 having received the updating command sends the request for updating to at least one of the first apparatus 25A and of the second apparatus 25B of the same vehicle 10. More specifically, the onboard server 20 sends the request for updating to each of the first apparatus 25A, of the second apparatus 25B and of the third apparatus 25C for which the onboard server 20 has received, during the transfer step 110, the modified data Mo1, Mo2, Mo3. According to the example of FIG. 2, the onboard server 20 of each vehicle 10 having received the updating command therefore sends the updating request to each of the first apparatus 25A and of the second apparatus 25B and of the third apparatus 25C.

According to the example of FIG. 2, during the sub-step for sending 180, the onboard server 20 sends an updating request simultaneously to each of the first apparatus 25A, of the second apparatus 25B and of the third apparatus 25C. Alternatively, the onboard server 20 sends the updating requests to the first apparatus 25A, to the second apparatus 25B and to the third apparatus 25C according to a predetermined order. For example, the onboard server 20 waits for the replacement sub-step 200 applied for the second apparatus 25B is completed for sending the updating request to the first apparatus 25A.

During the sub-step for sending back 190, at least one apparatus 25A, 25B, 25C sends back the updating authorization to the onboard server 20.

Preferably, at least one apparatus 25A, 25B, 25C only sends back the updating authorization if the vehicle 10 is in the inactive state.

In the example of FIG. 2, the vehicle 10 is in the active state when the onboard server 20 sends the updating request. The first apparatus 25A and the second apparatus 25B then sends back the respective updating authorizations to the onboard server 20. The third apparatus 25C, itself does not send back the updating authorization. The third apparatus 25C waits for the vehicle 10 to switch into the inactive state before sending back the updating authorization. This is illustrated in FIG. 2 by an arrow in dash-dot lines.

During the replacement sub-step 200, each apparatus 25A, 25B, 25C having sent back the updating authorization received from the onboard server 20 the corresponding modified data Mo1, Mo2, Mo3 through the local network R1. The initial data are replaced in the second memory 50, with the corresponding modified data Mo1, Mo2, Mo3.

The replacement sub-step 200 is applied, for each apparatus 25A, 25B, 25C for which the modified data Mo1, Mo2, Mo3 have been received, after reception by the onboard server 20 of the updating authorization sent back by the relevant apparatus 25A, 25B, 25C.

When the modified data Mo1, Mo2, Mo3 have been stored in memory in the second memory 50 of the corresponding apparatus 25A, 25B, 25C, an end message EM is for example transmitted to the onboard server 20 through the local network R1. The end message EM for example contains an identifier of the relevant apparatus 25A, 25B, 25C and the date of emission of the end message EM.

The replacement sub-step 200 is for example applied for the first apparatus 25A after the end message EM sent by the second apparatus 25B has been received by the onboard server 20.

By means of the invention, the modified data Mo1, Mo2, Mo3 are stored in memory in the memory 50 of each apparatus 25A, 25B, 25C without requiring the intervention of a technician. The updating of the apparatuses 25A, 25b, 25C of the plurality of vehicles 10 is therefore faster, and the availability of the vehicles 10 is improved.

Further, the modified data Mo1, Mo2, Mo3 are stored in memory in each onboard server 20 before emission of the updating command. Thus, the modified data Mo1, Mo2, Mo3 may be transmitted to each vehicle 10 with a relatively low throughput, and the updating of the vehicles 10 is nevertheless, quasi-simultaneous. It is not necessary to provide a great transmission rate for obtaining such a simultaneous update. Further, very few personnel are required for the updating.

Further, the method is not very sensitive to the connection interruptions between the onboard servers 20 and the server(s) on the ground 55, since the data transfer between the server on the ground 55 and the onboard servers 20 takes place during a step prior to the updating of the apparatuses 25A, 25B, 25C.

Further, by the use of the check sum CS and of a FTP protocol, the transfer step 110 is robust and not very sensitive to possible interruptions of the extended network R2, or to temporary shutoffs of the server on the ground 55 or of the relevant onboard server 20.

As the transmission step 140 is applied for the first apparatus 25A after it has been applied for the second apparatus 25B, the second apparatus 25B is permanently capable of communicating with the first apparatus 25A. In particular, incompatibilities due to different updates are avoided.

In a second exemplary embodiment of the updating method, the initialization steps 100, the transfer steps 110 and the memory storage steps 120 are applied for each vehicle 10.

During a first emission step 130, the updating command is sent to a single vehicle 10 intended to play the role of a test message. The transmission step 140 is then applied for the test vehicle 10. Next, the proper operation of the test 10 is verified. For example, each apparatus 25A, 25B, 25C having been updated in the test vehicle 10 is tested.

If no problem is detected during the tests, the emission step 130 and the transmission step 140 are applied for each other vehicle 10 of the list.

If a problem is detected during the tests, a second transfer step is applied. During the second transfer step, rectified data Dr are transferred from the server on the ground 55 to each onboard server 20. The rectified data are intended to replace at least partly the updating data Dm in the first memory 35 of each server 20. In other words, the rectified data Dr comprise a correction of the updating data Dm. For example, the rectified data Dr are intended to partly replace one from among the first modified data Mo1, the second modified data Mo2 and the third modified data Mo3.

The emission step 130 and the transmission step 140 are then applied for each other vehicle 10 of the list, from modified updating data Dm by means of the rectified data Dr.

The method then gives the possibility of easily testing the validity of the updating data.

The invention claimed is:

1. A method for updating a plurality of vehicles, each vehicle including an onboard server, a first electronic apparatus and at least one second electronic apparatus, the onboard server comprising a first memory and a radiofrequency communication module and each of the first apparatus and of the second apparatus comprising a controller and a second memory storing a set of initial data, each onboard server being connected to each of the first apparatus and of the second apparatus mounted in the same vehicle with a local internal communication network to the vehicle, wherein the method comprises the steps of:
    transferring updating data, through an extended radiofrequency communication network, from at least one server on the ground towards the onboard servers of the vehicles of said plurality, the updating data including modified data intended to be stored in the second memory of at least one of the first apparatus and of the second apparatus of each relevant vehicle,
    storing the updating data in the first memory of each vehicle,
    determining, by the server on the ground, that the updating data have been stored in the first memory of each vehicle;
    simultaneously emitting through the extended network, from the server on the ground, an updating command intended for the onboard server of each vehicle, after the server on the ground determines that the updating data have been stored in the first memory of each vehicle, and
    transmitting, from each onboard server having received the updating command, modified data to at least one of the first apparatus and of the second apparatus through the corresponding local network, the modified data replacing, in the second memory of said apparatus, the initial data, wherein:
        the step for transmitting is successively applied for the first apparatus and the second apparatus of the vehicle according to a predetermined order, and
        the first apparatus is configured for transmitting information between the second apparatus and the onboard server, the updating data comprising first modified data intended to be stored in the second memory of the first apparatus and second modified data intended to be stored in the second memory of the second apparatus, the second modified data being transmitted to the second apparatus during the step for transmitting, no first modified data being transmitted to the first apparatus before the second modified data have been entirely stored in memory by the second apparatus.

2. The method according to claim 1, wherein the step for transmitting comprises sub-steps for:
    sending an update request, from each onboard server having received the updating command, to at least one from among the first apparatus and the second apparatus of the same vehicle,
    sending back, from said apparatus an updating authorization to the onboard server, and
    replacing, in said apparatus, the initial data with modified data, the sub-step for replacing being applied after receiving, by the onboard server, the corresponding updating authorization.

3. The method according to claim 2, wherein an active state and an inactive state are defined for each vehicle of the plurality, the inactive state being representative of the fact that the vehicle is not in motion and the active state being representative of the fact that the vehicle is in motion, at least one of the first apparatus and of the second apparatus being configured for, during the sub-step for sending back, sending back the updating authorization if the vehicle is in the inactive state and, if said vehicle is in the active state, waiting for said vehicle to switch into the inactive state for sending back the updating authorization.

4. The method according to claim 1, wherein, in the step for emitting, the updating command is simultaneously emitted by the server on the ground intended for each onboard server of the plurality of vehicles.

5. The method according to claim 1, wherein the updating data are distributed in a set of data packets and, during the step for transferring, a set of transfer messages is emitted by the server on the ground intended for each onboard server, each transfer message including a data packet and a check sum, the onboard server being configured for calculating each check sum from the corresponding data packet, and for comparing the calculated check sum with the check sum contained in the transfer message, each check sum calculated by each onboard server being further transmitted to the server on the ground, the server on the ground comparing each received check sum with the check sum transferred with the corresponding transfer message.

6. The method according to claim 1, wherein the beginning of the step for emitting is shifted from the end of the step for transferring by a time shift greater than or equal to 5 seconds.

7. An assembly formed with a plurality of railway vehicles and with a system for managing the plurality of railway vehicles, each railway vehicle including an onboard server, a first electronic apparatus and at least one second electronic apparatus, the onboard server comprising a first memory and a radiofrequency communication module and each of the first apparatus and of the second apparatus comprising a controller and a second memory storing a set of initial data, each onboard server being connected to each of the first apparatus and of the second apparatus through a local internal communication network to the vehicle, and the management system including a server on the ground, wherein the server on the ground is configured to:
    transfer, through a radiofrequency communication, updating data to the onboard server of each vehicle through an extended network, the updating data including modified data intended to be stored in the second memory of at least one of the first apparatus and of the second apparatus, determine that the updating data have been stored in the first memory of each vehicle having received the updating data, and simultaneously emit, through the extended network, an updating command intended for the onboard server of each vehicle of the plurality of vehicles after determining that the updating data have been stored in the first memory of each vehicle having received the updating data, and wherein each onboard server is configured for:

storing the updating data in the first memory, and subsequently to receiving the updating command, transmitting the modified data to at least one from among the first apparatus and the second apparatus through the corresponding local network, the modified data replacing, in the second memory of said apparatus, the initial data, wherein:

the step for transmitting is successively applied for the first apparatus and the second apparatus of the vehicle according to a predetermined order, and the first apparatus is configured for transmitting information between the second apparatus and the onboard server, the updating data comprising first modified data intended to be stored in the second memory of the first apparatus and second modified data intended to be stored in the second memory of the second apparatus, the second modified data being transmitted to the second apparatus during the step for transmitting, no first modified data being transmitted to the first apparatus before the second modified data have been entirely stored in memory by the second apparatus.

* * * * *